(12) United States Patent
Nagoya

(10) Patent No.: US 12,376,583 B2
(45) Date of Patent: Aug. 5, 2025

(54) ELECTRIC DEVICE AND ELECTRIC FIELD BARRIER FORMING DEVICE

(71) Applicant: NAGOYA General Incorporated Association, Nagasaki (JP)

(72) Inventor: Satoshi Nagoya, Nagasaki (JP)

(73) Assignee: NAGOYA GENERAL INCORPORATED ASSOCIATION, Nagasaki (JP)

( * ) Notice: Subject to any disclaimer, the term of this patent is extended or adjusted under 35 U.S.C. 154(b) by 0 days.

(21) Appl. No.: 18/203,645

(22) Filed: May 30, 2023

(65) Prior Publication Data

US 2024/0172741 A1 May 30, 2024

Related U.S. Application Data

(63) Continuation-in-part of application No. 18/083,452, filed on Dec. 16, 2022.

(30) Foreign Application Priority Data

Nov. 29, 2022 (JP) .................................. 2022-190861

(51) Int. Cl.
*A01M 29/24* (2011.01)
*A01K 97/00* (2006.01)
*H02M 7/00* (2006.01)

(52) U.S. Cl.
CPC ............. *A01M 29/24* (2013.01); *A01K 97/00* (2013.01); *H02M 7/003* (2013.01); *A01K 2227/40* (2013.01)

(58) Field of Classification Search
CPC ..................................................... A01M 29/24
See application file for complete search history.

(56) References Cited

U.S. PATENT DOCUMENTS

| 2012/0031343 A1* | 2/2012 | DeLuze ................... B63C 9/05 119/220 |
| 2015/0150237 A1* | 6/2015 | Valls ...................... A01M 29/28 |
| 2020/0022357 A1* | 1/2020 | Furusawa ............. A01M 29/24 |
| 2022/0264870 A1* | 8/2022 | Kibel .................... A01M 29/24 |

FOREIGN PATENT DOCUMENTS

JP 2006-149275 A 6/2006

* cited by examiner

*Primary Examiner* — Joshua J Michener
*Assistant Examiner* — Henry Hooper Mudd
(74) *Attorney, Agent, or Firm* — Hassan Abbas Shakir; Shakir Law PLLC

(57) ABSTRACT

An electronic device for repelling fish with Lorenzini organs includes (1) a generator having a power supply and output terminals including a first output terminal and a second output terminal, for converting a DC voltage supplied from the power supply to an AC voltage having an amplitude of less than 100V and outputting the AC voltage from the output terminals, (2) at least one electric wire, one or each of which is connected to one or both of the first output terminal and the second output terminal, and (3) a power switch that forms an electric circuit together with the generator and the at least one electric wire to turn on and off the output from the power supply, and that causes the power supply to supply a DC voltage when the first output terminal and the second output terminal are electrically connected via the seawater.

9 Claims, 15 Drawing Sheets

ELECTRIC DEVICE AND ELECTRIC FIELD BARRIER FORMING DEVICE

CROSS-REFERENCE TO THE RELATED APPLICATIONS

This application is a continuation-in-part of and claims priority to U.S. Ser. No. 18/083,452 filed on Dec. 16, 2022, which is pending and which is hereby incorporated by reference in its entirety for all purposes.

U.S. Ser. No. 18/083,452 claims priority to Japanese Patent Application No. 2022-190861 filed on Nov. 29, 2022. The entire disclosure of Japanese Patent Application No. 2022-190861 is hereby incorporated by reference for all purposes.

FIELD OF THE INVENTION

The invention is directed to repelling device for fish that have Lorenzini organ, for example a shark repelling device for fishing that repels sharks that flock to caught fish. More particularly, the repelling device that includes a generator having a power supply and output terminals including a first output terminal and a second output terminal, for converting a DC voltage supplied from the power supply to an AC voltage having an amplitude of less than 100V and outputting the AC voltage from the output terminals.

BACKGROUND

JP2006-149275A discloses a shark repelling device for fishing that repels sharks that flock to caught fish. This shark repelling device for fisheries includes a first electrode placed in the seawater near a fishing boat, a second electrode placed in the seawater at a predetermined distance from the first electrode, and a power supply for applying a DC voltage such that one of the first electrode and the second electrode is a positive electrode and the other is a negative electrode. A DC pulse having a voltage of 600 V and a pulse width of 0.5 msec. is applied to each of the first electrode and the second electrode while the polarity is alternately switched twice per second. As a result, sharks approaching fishing boats are given an electrical shock, which can drive them away.

In the case of the fishery shark repelling device above, a DC voltage of 600 V is applied to the first electrode or the second electrode. Therefore, for example, an electric shock that stimulates Lorenzini organ can be applied to a shark located at a distance of several tens of meters or more from each electrode. However, it is not possible to apply an electric shock sufficient to stimulate Lorenzini organ in the vicinity, such as within 1 m from each electrode. In addition, when humans and sharks around the first electrode or the second electrode directly contact both electrodes and form a current path, humans may be electrocuted.

SUMMARY

Problems to be Solved by the Invention

One of the purposes of this embodiment is to provide an electronic device capable of repelling approaching fishes having Lorenzini organs without electrocuting humans and fishes having Lorenzini organs.

Means Used to Solve the Above-Mentioned Problems

An electronic device, for repelling fish with Lorenzini organs, of the first aspect includes (1) a generator having a power supply and output terminals including a first output terminal and a second output terminal, for converting a DC voltage supplied from the power supply to an AC voltage having an amplitude of less than 100V and outputting the AC voltage from the output terminals, (2) at least one electric wire, one or each of which is connected to one or both of the first output terminal and the second output terminal, and (3) a power switch that forms an electric circuit together with the generator and the at least one electric wire to turn on and off the output from the power supply, and that causes the power supply to supply a DC voltage when the first output terminal and the second output terminal are electrically connected via the seawater.

An electronic device of the second aspect has the following features on the premise of the electronic device of the first aspect. The at least one electric wire is two electric wires each having one end connected to each of the first output terminal and the second output terminal and each of the two electric wires is configured to be attached to each of both human legs.

An electronic device of the third aspect has the following features on the premise of the electronic device of the first aspect. The electronic device of the third aspect, further includes a housing having an opening, the housing that accommodates the generator and the power switch therein and that passes the at least one electric wire through the opening and a hook fixed to the housing and that passes through a fishing line.

An electronic device of the fourth aspect has the following features on the premise of the electronic device of the first aspect. A waveform of an AC voltage output by the generator is a composite waveform in which a plurality of types of AC waveforms are superimposed.

An electronic device of the fifth aspect has the following features on the premise of the electronic device of the fourth aspect. The plurality of types of AC waveforms differs from each other in all or at least one of amplitude, period, and phase.

An electronic device of the sixth aspect has the following features on the premise of the electronic device of the first aspect. The generator further includes a storage that stores a plurality of patterns of AC voltage, which is output from the output terminals, having different waveforms and a selecting switch for selecting one of the plurality of patterns of AC voltage stored in the storage.

An electronic device of the seventh aspect has the following features on the premise of the electronic device of the sixth aspect. The selecting switch is capable of receiving a wireless selective signal from the outside and selecting one of the plurality of patterns of AC voltage.

An electronic device of the eighth aspect has the following features on the premise of the electronic device of the sixth aspect. The power switch has an electrical current sensor, and is configured to supply a DC voltage from the power supply when the electrical current sensor detects an electrical current flowing between the first output terminal and the second output terminal and the selecting switch selects one of the plurality of patterns of AC voltage stored in the storage according to the magnitude of the electrical current detected by the electrical current sensor.

An electric field barrier forming device, for forming an electric field barrier for repelling fish having Lorenzini organs, of the first aspect includes (A) an electronic device group comprising a plurality of electronic devices, each of which is the electronic of any one of the first to the eighth aspect, wherein: (A1) the at least one electric wire of each electronic device is a pair of electric wires each having one end connected to each of the first output terminal and the second output terminal; (A2) both the other ends of the plurality of pairs of electric wires are respectively arranged along a vertical or substantially vertical direction in the seawater; and (A3) all the other ends of the plurality of pairs of electric wires are arranged side by side in a direction crossing the vertical or substantially vertical direction and (B) a group controller that controls waveforms of AC voltages output from generators of the plurality of electronic devices, wherein the group controller controls at least one waveform and at least one phase among the waveforms of each AC voltage output by each generator to a waveform or phase different from other waveforms or phases.

An electric field barrier forming device, for forming an electric field barrier for repelling fish having Lorenzini organs, of the second aspect includes (A) an electronic device group comprising a plurality of electronic devices, each of which is the electronic device of any one of the first to the eighth aspect, wherein: (A1) the at least one electric wire of each electronic device is a pair of electric wires each having one end connected to each of the first output terminal and the second output terminal; (A2) the other ends of the plurality of electric wires connected to either one of the first output terminal and the second output terminal are arranged so as to gather at one point in the seawater, and the other ends of the plurality of electric wires connected to the other of the first output terminal and the second output terminal are arranged apart from each other so as to form a circumference outside the one point; and, (B) a group controller that controls waveforms of AC voltages output from generators of the plurality of electronic devices, wherein the group controller controls at least one waveform and at least one phase among the waveforms of the AC voltages output from each generator to a waveform or phase different from other waveforms or phases.

According to the electronic device of the first aspect, it is possible to drive off approaching fishes having Lorenzini organs without electrocuting humans and fishes having Lorenzini organs around them.

According to the electronic device of the second aspect, it is possible to reduce the possibility of a person stepping on a ray on the seabed when walking in the seawater.

According to the electronic device of the third aspect, it is possible to reduce the possibility of a shark biting a fish caught by a human using a fishing rod.

According to the electronic device of the fourth and fifth aspect, compared to the case where the waveform of the AC voltage output by the generator is a simple AC waveform, it is possible to repel approaching fishes having Lorenzini organs. Further, compared to the case where the waveform of the AC voltage output from the generator is a simple AC waveform, it is possible to drive away multiple species of fish having Lorenzini organs that have approached.

According to the electronic device of the sixth aspect, it is possible to select a waveform pattern for driving away multiple species of fish having Lorenzini organs that have approached.

According to the electronic device of the seventh aspect, it is possible to operate from the sea to change the waveform pattern capable of driving off approaching fish of multiple species having Lorenzini organs.

According to the electronic device of the eighth aspect, multiple species of fish having Lorenzini organs can be repelled by estimating the seawater temperature according to the magnitude of the detected current and using the pattern selected from the patterns stored in the storage.

According to the electric field barrier forming device of the first and second aspect, compared to the case where the waveforms of the AC voltages output by all the generators have the same pattern, it is possible to repel fishes having Lorenzini organs that have approached the electric field barrier.

BRIEF DESCRIPTION OF THE DRAWINGS

These drawings illustrate certain aspects of some of the embodiments of the present invention and should not be used to limit or define the invention.

DETAILED DESCRIPTION

Figure 1:
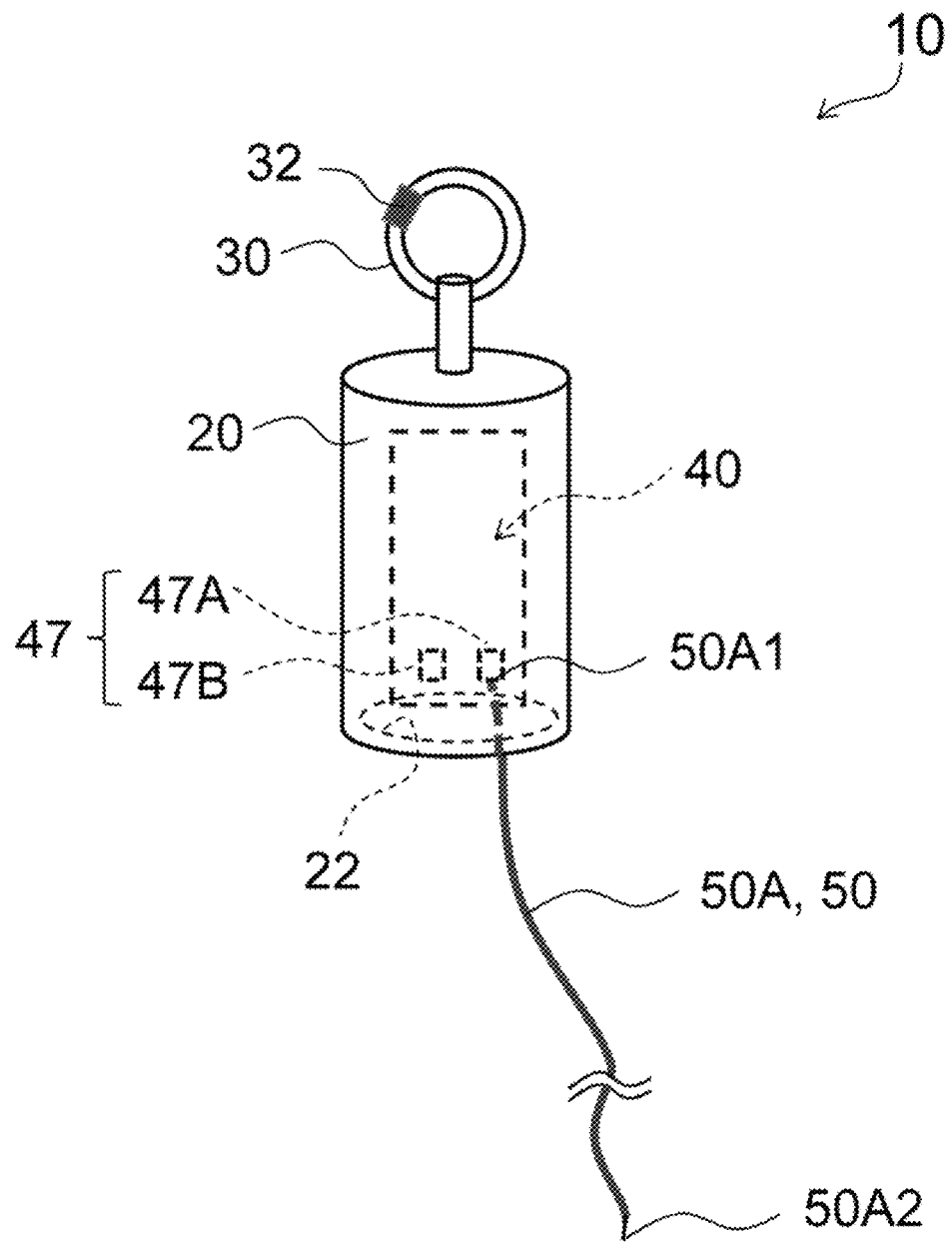
FIG. 1 is a schematic diagram of an electronic device according to this embodiment.

An electronic device 10 of the present embodiment (see FIGS. 1 and 2), an electric field barrier forming apparatus 100 of this embodiment (see FIG. 6), and modifications thereof will be described below. In this specification, it should be noted that in each drawing referred to in different embodiments, etc., the same reference numerals or similar reference numerals are given to components having similar functions.

Electric Device

First, the electronic device 10 of this embodiment will be described with reference to the drawings for its configuration, functions, usage, and effects.

Configuration and Function

FIG. 1 is a schematic diagram of the electronic device 10. The electronic device 10 is used with a part or all of it placed in underwater SW, and has a function of repelling fish having Lorenzini organs such as sharks SK and rays RY (see FIGS. 5, 7, etc.).). The electronic device 10, as shown in FIG. 1, includes a housing 20, a hook 30, a circuit board 40, and an electric wire 50A.

Housing and Hook

The housing 20 is, for example, a resin-made bottomed cylinder with an opening 22 formed at one end. The housing 20 accommodates the circuit board 40 therein, and an electric wire 50A (details of which will be described later) connected to the circuit board 40 passes through the opening 22. The hook 30 is fixed to the end of the housing 20 opposite to the opening 22. The hook 30 has an opening/closing mechanism 32 that can be opened and closed, and is configured, for example, so that the fishing line FL (see FIG. 4) is passed through the opening/closing mechanism 32.

Circuit Board

Figure 2:
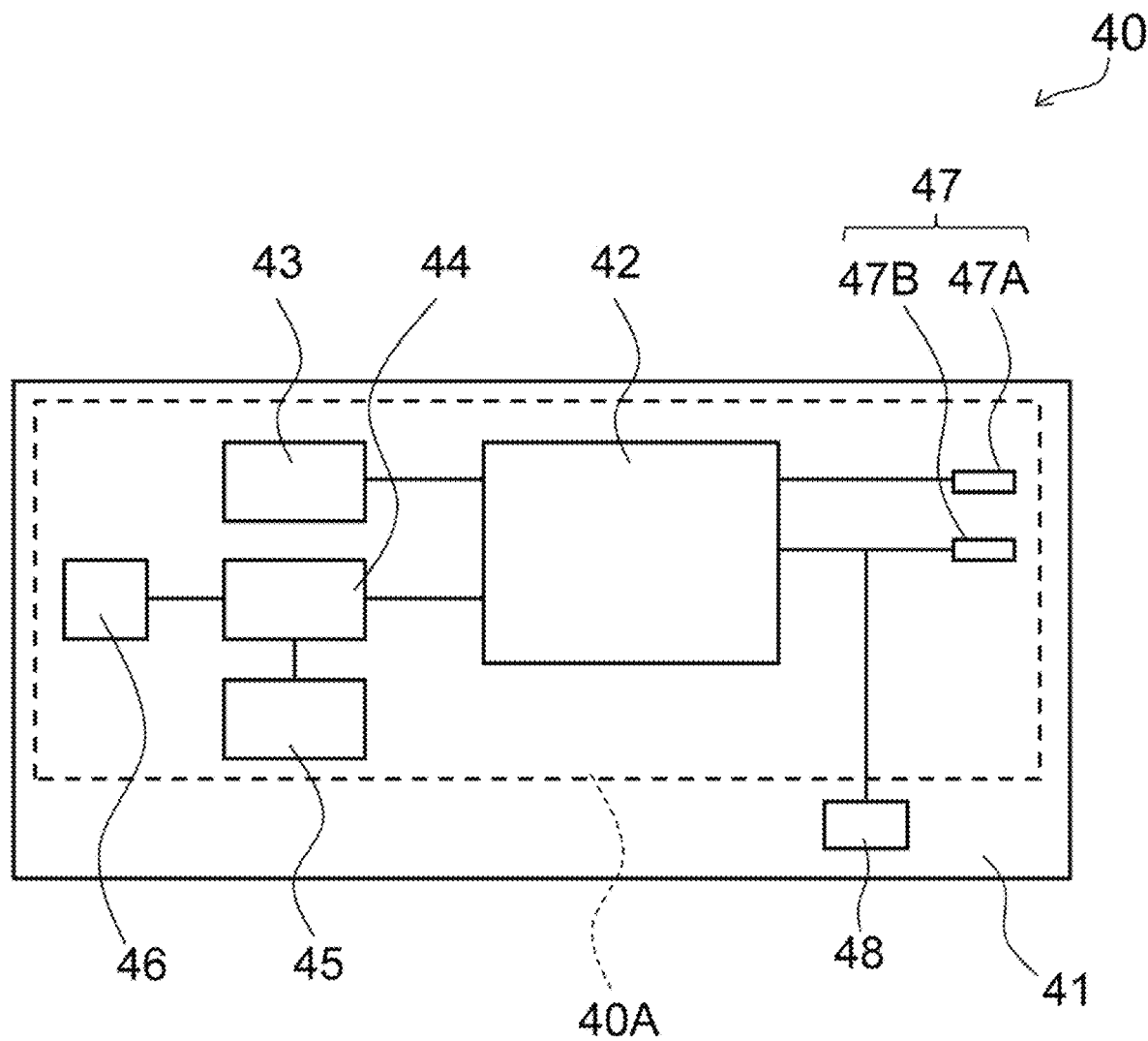
FIG. 2 is a block diagram of a circuit board included in an electronic device of this embodiment.

FIG. 2 is a block diagram of the circuit board 40 included in the electronic device 10. The circuit board 40 has a printed wiring board 41, a converter 42, a power supply 43, a controller 44, a storage 45, a selecting switch 46, output terminals 47 and a power switch 48. These constitute an electric circuit as a whole. In this specification, the components other than the power switch 48 on the circuit board 40 are referred to as a generator 40A.

A circuit pattern (not shown) is printed on the printed wiring board 41. The converter 42, the power supply 43, the controller 44, the storage 45, the selecting switch 46, the output terminals 47 and the power switch 48 are mounted on the printed wiring board 41.

The converter 42 is electrically connected to the power supply 43 and the output terminals 47, and has a function of converting a DC voltage supplied from the power supply 43 into an AC voltage having an amplitude of less than 100V. The AC voltage converted by the converter 42 is output from the output terminals 47.

The power supply 43 is, for example, a battery detachable from the printed wiring board 41.

The controller 44 is electrically connected to the converter 42 and the storage 45, and a plurality of waveform patterns in which a DC voltage supplied from the power supply 43 is stored in the storage 45 (see FIGS. 3A to 3F). The converter 42 is controlled so as to be converted into an AC voltage having one of the waveform patterns. The plurality of waveform patterns mentioned above will be described later.

The storage 45 stores, as an AC voltage to be output from the output terminals 47, waveform patterns of AC voltages of a plurality of types of AC waves having different waveforms.

The selecting switch 46 is a switch for selecting one of the waveform patterns of AC voltages of a plurality of types of AC waves having different waveforms stored in the storage 45.

The output terminals 47 have a first output terminal 47A for outputting an AC voltage and a second output terminal 47B to which a reference voltage (0V) is applied. In FIG. 1, as an example, the electric wire 50A is connected to the first output terminal 47A, but the reverse is also possible.

The power switch 48 configures an electric circuit together with the generator 40A and the electric wire 50A to turn the output from the power supply 43 on and off. The power switch 48 is configured to supply a DC voltage from the power supply 43 when the first output terminal 47A and the second output terminal 47B are electrically connected via the seawater. Specifically, the power switch 48 has an electrical current sensor (not shown). When the first output terminal 47A and the second output terminal 47B are electrically connected to each other, the electrical current sensor detects a weak current flowing between the first output terminal 47A and the second output terminal 47B, thereby causing the power supply 43 to supply a DC voltage.

Next, a plurality of waveform patterns stored in the storage 45 will be described with reference to FIGS. 3A to 3F. FIGS. 3A-3F each show a diagram of one example of waveform patterns of a plurality of AC voltages.

Common Point of all Waveform Patterns (Pattern of Output Voltage Vs. Time)

Each waveform pattern shows the waveform of the AC voltage applied to the first output terminal 47A with respect to the voltage of the second output terminal 47B to which the reference voltage (0V) is applied.

The common points of all waveform patterns are as follows:

As shown in FIGS. 3A to 3F, each waveform pattern is a pattern that periodically changes polarity;

As an example, the amplitude AP of each waveform pattern is set to be less than 100 V at maximum; and, As an example, the period T of each waveform pattern is set to 0.2 s or more and 10.0 s or less.

Singularity of Each Waveform Pattern

Figure 3A:
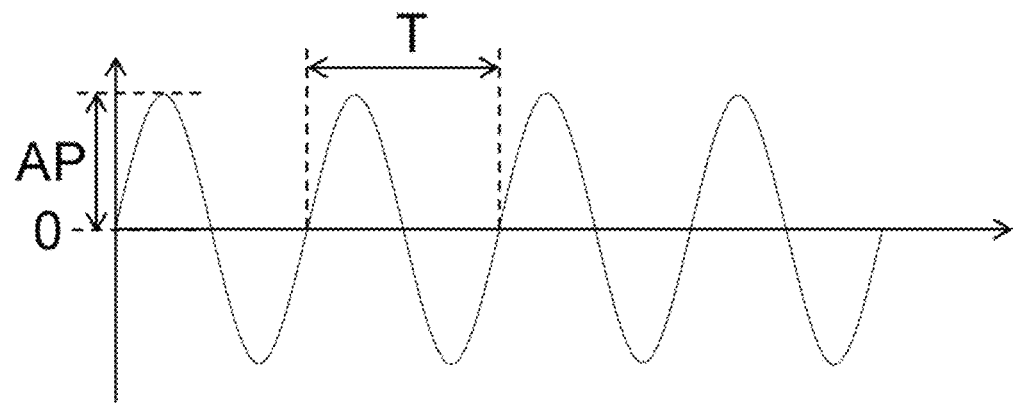
FIG. 3A is an example of waveform patterns of a plurality of AC voltages output by an electronic device of this embodiment.
Figure 3B:
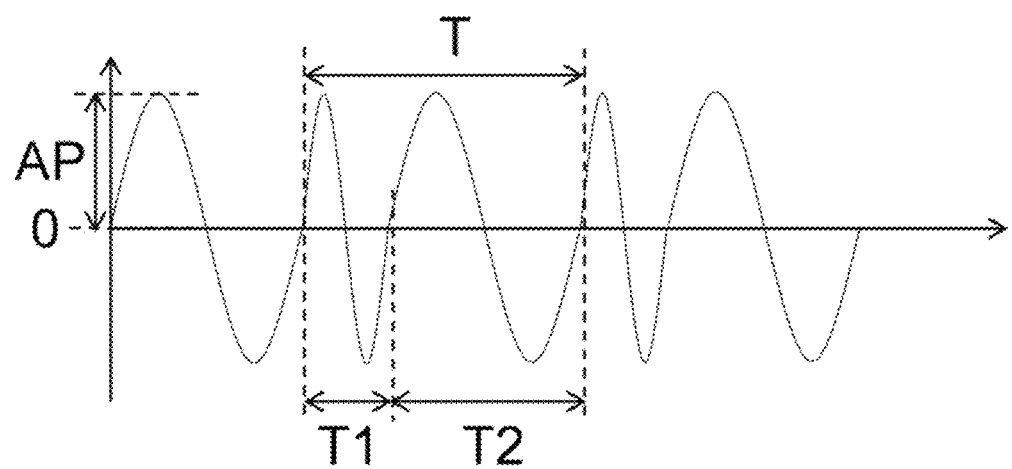
FIG. 3B is another example of waveform patterns of a plurality of AC voltages output by an electronic device of this embodiment.
Figure 3C:
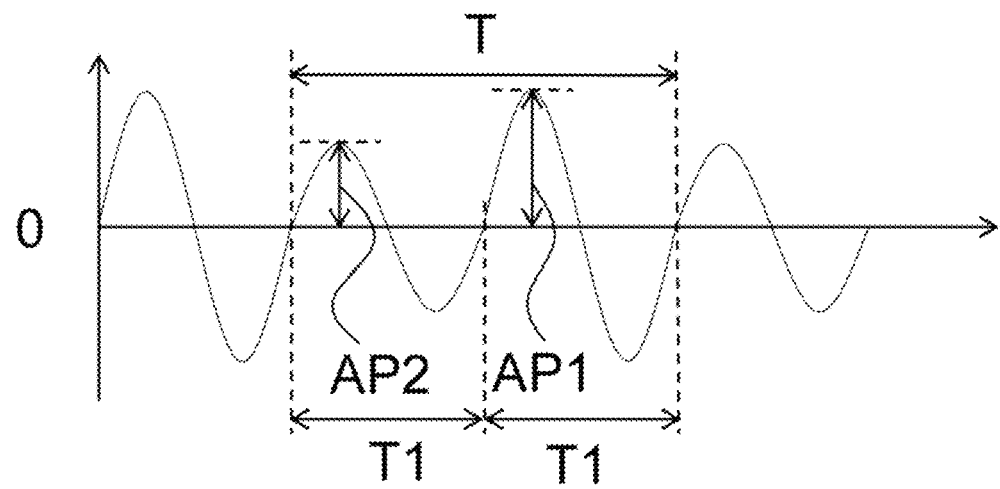
FIG. 3C is another example of waveform patterns of a plurality of AC voltages output by an electronic device of this embodiment.
Figure 3D:
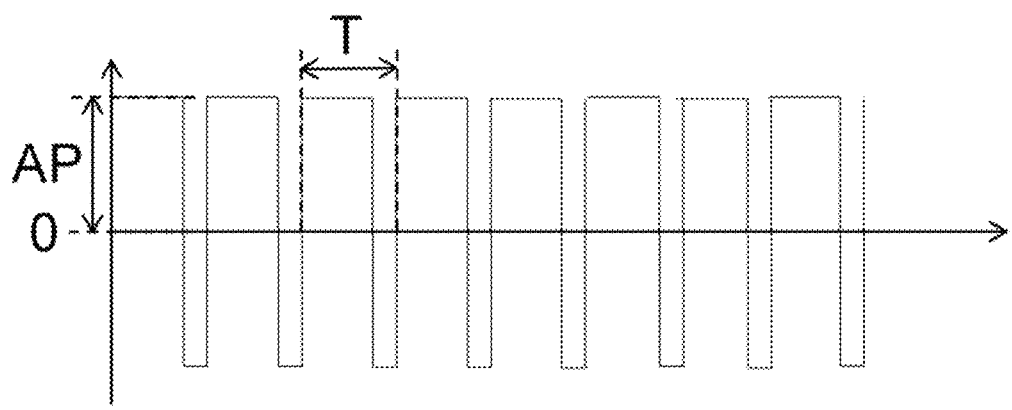
FIG. 3D is another example of waveform patterns of a plurality of AC voltages output by an electronic device of this embodiment.
Figure 3E:
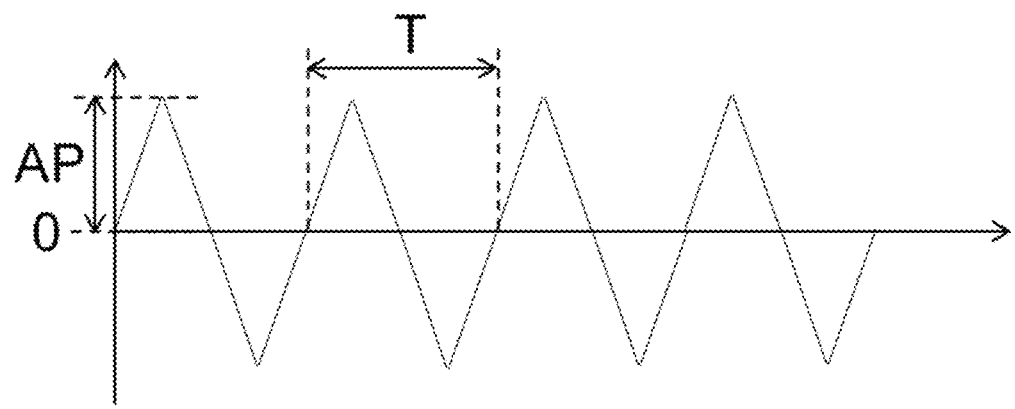
FIG. 3E is another example of waveform patterns of a plurality of AC voltages output by an electronic device of this embodiment.
Figure 3F:
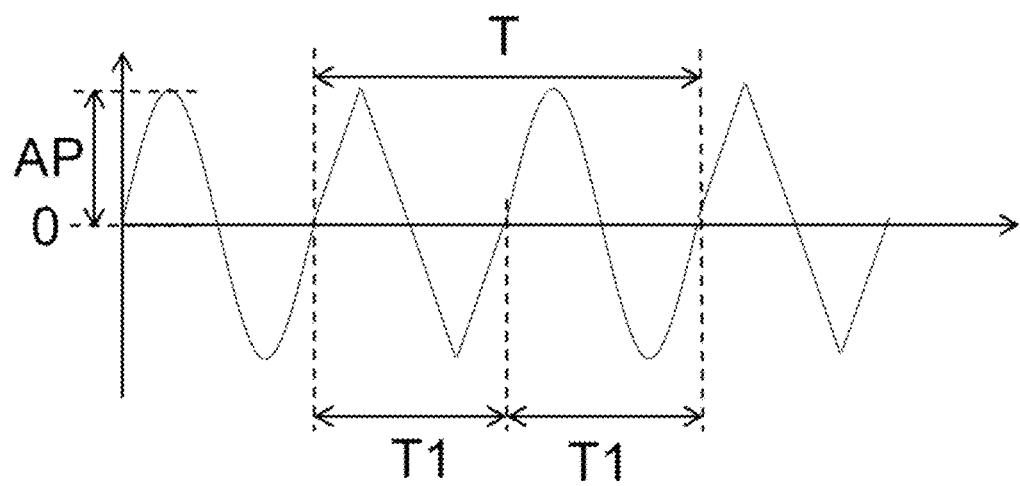
FIG. 3F is another example of waveform patterns of a plurality of AC voltages output by an electronic device of this embodiment.

The singular points of each waveform pattern are as follows:

The waveform pattern in FIG. 3A is a sine wave;

The waveform pattern in FIG. 3B is a waveform pattern in which a first sine wave with a period T1 and a second sine wave with a period T2 shorter than the period T1 are alternately output;

The waveform pattern in FIG. 3C is a waveform pattern in which a first sine wave with amplitude AP1 and period T1 and a second sine wave with amplitude AP2 smaller than amplitude AP1 and period T1 are alternately output;

The waveform pattern in FIG. 3D is a rectangular wave with period T. The duty of this rectangular wave is, for example, configured such that the positive polarity output time is longer than the negative polarity output time;

The waveform pattern in FIG. 3E is a triangular wave with a period T; and,

The waveform pattern in FIG. 3F is a waveform pattern in which a sine wave with period T1 and a triangular wave with period T1 are alternately output.

Electrical Wire

The electric wire 50A is connected at its one end 50A1 to the first output terminal 47A, as shown in FIG. 1. The length of the electric wire 50A is, for example, 0.5 m or more and 10 m or less. In the case of the electronic device 10 in FIG. 1, an AC electric field is formed between the other end 50A2 of the electric wire 50A and the second output terminal 47B by applying an AC voltage from the converter 42.

The above is the description of the configuration and functions of the electronic device 10 of this embodiment.

Usage

Figure 4:
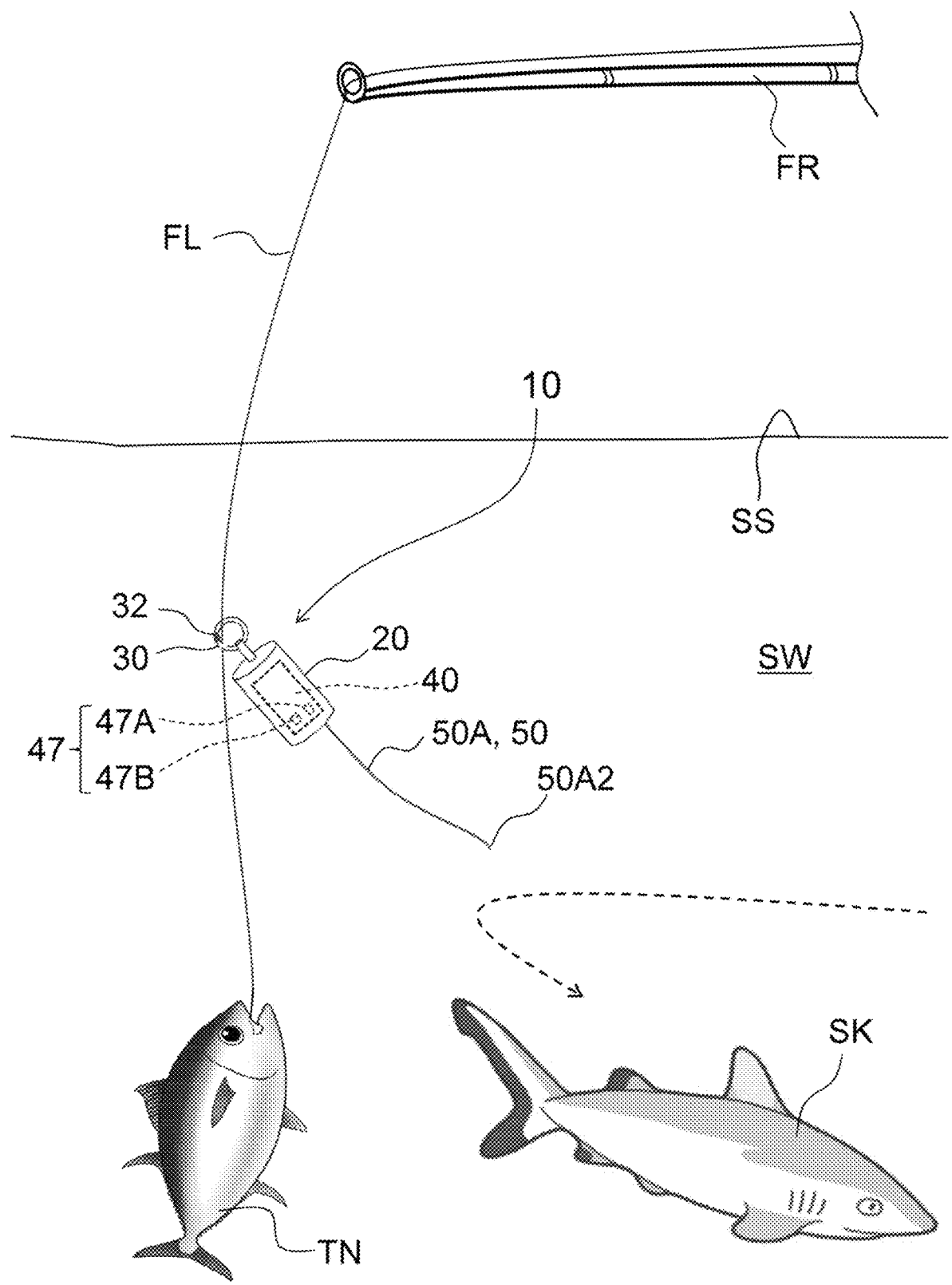
FIG. 4 is a diagram for explaining a usage example when the electronic device of the present embodiment is used for sea fishing.

Next, the usage of the electronic device 10 of this embodiment will be described with reference to FIG. 4, 5, etc.

The First Example of Usage

A first example of how to use the electronic device 10 will be described with reference to FIG. 4. FIG. 4 is a diagram for explaining a usage example when the electronic device 10 is used for sea fishing. In this case, the electronic device 10 is used by a sea fishing person (an angler (not shown)).

When a fish (not shown) is hooked on the fish hook (not shown) of the fishing line FL connected to the fishing rod FR, the angler moves the hook 30 from the opening/closing mechanism 32 of the electronic device 10 to the inside of the hook 30.

The angler then lets go of the electronic device 10. As a result, the electronic device 10 sinks in the seawater SW due to its own weight. When the electronic device 10 is submerged in the seawater SW, the electrical current sensor of the power switch 48 detects a weak current flowing between the first output terminal 47A and the second output terminal 47B, and a direct current is supplied from the power supply 43 to the converter 42. Along with this, the generator 40A is activated, and an AC waveform having a preset waveform pattern is output from the output terminals 47.

As a result, an alternating electric field, which has the amplitude AP is less than 100V and the period T is 0.2 s or more and 10.0 s, is formed between the other end 50A2 of the electric wire 50A and the second output terminal 47B (in the vicinity of the fish hooked) in the seawater SW.

In this situation, when the angler winds up the line FL with a reel (not shown) and the shark SK approaches, aiming at the fish TN associated with the fish hook approaching sea surface SS, the Shark SK's Lorenzini organs detect an alternating electric field formed in the vicinity of fish TN by the electronic device 10. Then, the shark SK judges that it is not the electric field by the fish TN depending on the detected AC waveform, and moves away from the fish TN. That is, the electronic device 10 drives away the shark SK.

The above is the explanation of the first example of usage.

The Second Example of Usage

Figure 5:
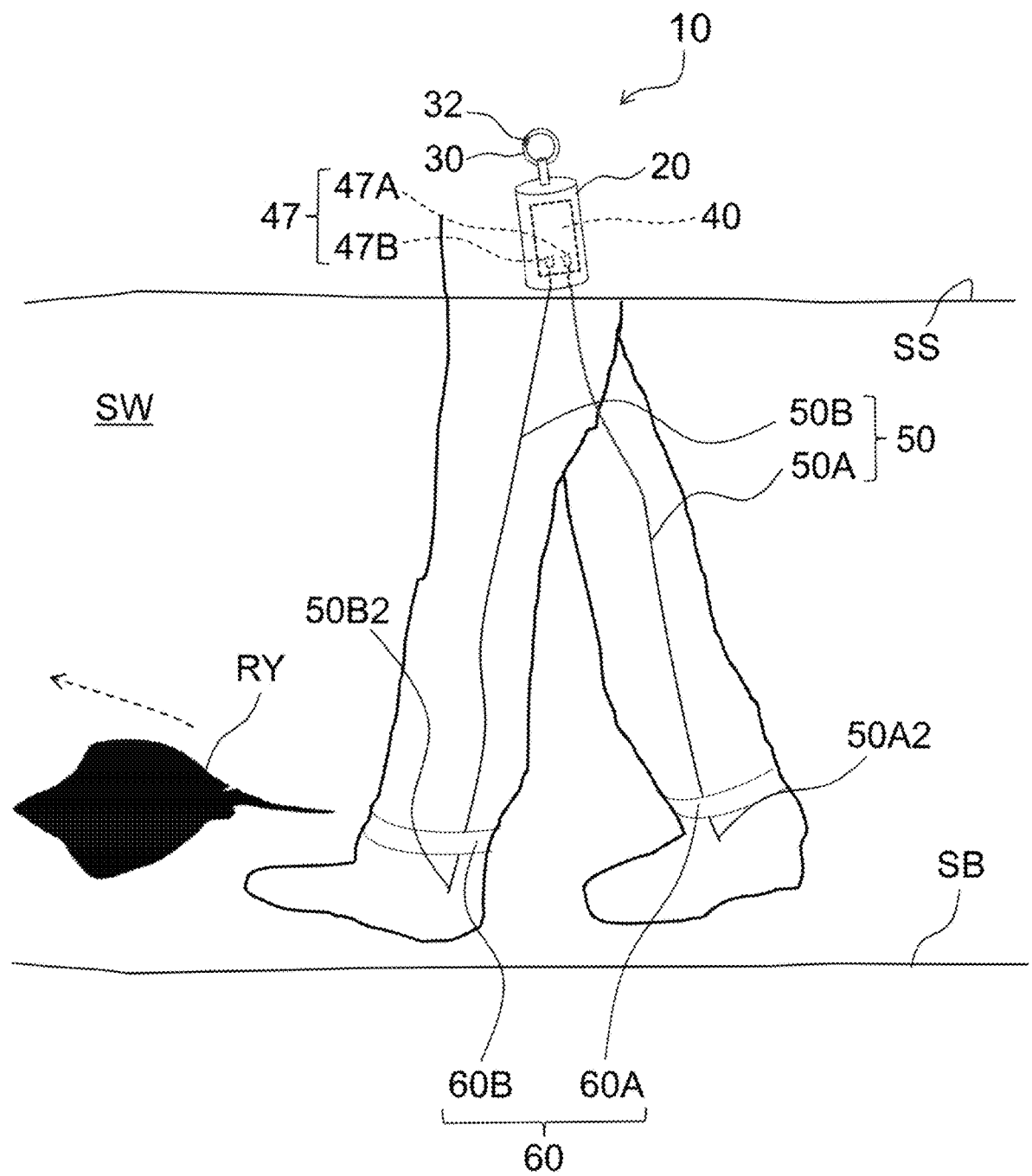
FIG. 5 is a diagram for explaining a usage example when an electronic device of this embodiment is used for underwater walking.

A second example of how to use the electronic device 10 will be described with reference to FIG. 5. FIG. 5 is a diagram for explaining a usage example when the electronic device 10 is used for walking in the seawater SW. In this case, a person who uses the electronic device 10 is, for example, a person who submerges the lower half of the body in the seawater SW and engages in sea fishing.

First, before entering the seawater SW, the angler holds the housing 20 by hooking the hook 30 near his waist, for example, and fixes the electric wire 50A to the right leg and the electric wire 50B to the left leg using the band 60. Specifically, the angler fixes the vicinity of the other end 50A2 of the electric wire 50A to the right leg with a band 60A and the vicinity of the other end 50B2 of the electric wire 50B to the left leg with the band 60B. Then, when the angler enters the seawater SW, the electrical current sensor of the power switch 48 detects a weak current flowing between the first output terminal 47A and the second output terminal 47B, and a direct current is supplied from the power supply 43 to the converter 42. Along with this, the generator 40A is activated, and an AC waveform having a preset waveform pattern is output from the output terminals 47.

As a result, an alternating electric field, which has the amplitude AP is less than 100V and the period T is 0.2 s or more and 10.0 s, is formed between between the other end 50A2 of the electric wire 50A and the other end 50B2 of the electric wire 50B in the seawater SW.

Then, the ray RY decides that it is not the electric field caused by the fish depending on the detected AC waveform, and moves away. In other words, the electronic device 10 drives away the ray RY.

The above is the explanation of the second example of usage.

The above is the description of how to use the electronic device 10 of this embodiment.

Effect

Next, the effects of the electronic device 10 of this embodiment will be described with reference to the drawings.

First Effect

In the shark repelling device disclosed in the above-mentioned patent document (JP2006-149275A), a DC voltage of 600V is applied to one of the first electrode and the second electrode. When a DC voltage of this magnitude is applied to one of the first electrode and the second electrode, it is difficult for the shark SK and ray RY around these electrodes to feel the electric field generated between these electrodes.

However, in the electronic device 10, the amplitude AP of the AC voltage to be output is set to less than 100V (for example, approximately 10V). As a result, the shark SK and the ray RY in the vicinity of the output terminals 47 are more likely to react with their Lorenzini organs. Also, humans and fishes having Lorenzini organs in the vicinity of the output terminals 47 will not be electrocuted.

Therefore, if the electronic device 10 of the present embodiment is used, the approaching shark SK or ray RY (that is, the fish having Lorenzini organs) can be driven away without electrocuting humans and fish having Lorenzini organs around it. (see FIGS. 4 and 5).

Second Effect

The electronic device 10 of this embodiment includes a power switch 48 that turns on and off the output from the power supply 43 that supplies power to the generator 40A (see FIG. 2). The power switch 48 is configured to supply a DC voltage from the power supply 43 when the first output terminal 47A and the second output terminal 47B are electrically connected via the seawater SW. The electronic device 10 is automatically turned off in the atmosphere and automatically turned on in the seawater SW.

Therefore, the electronic device 10 does not cause an electric shock to the user in the atmosphere. The electronic device 10 automatically starts operating in the usage environment.

Figure 10:
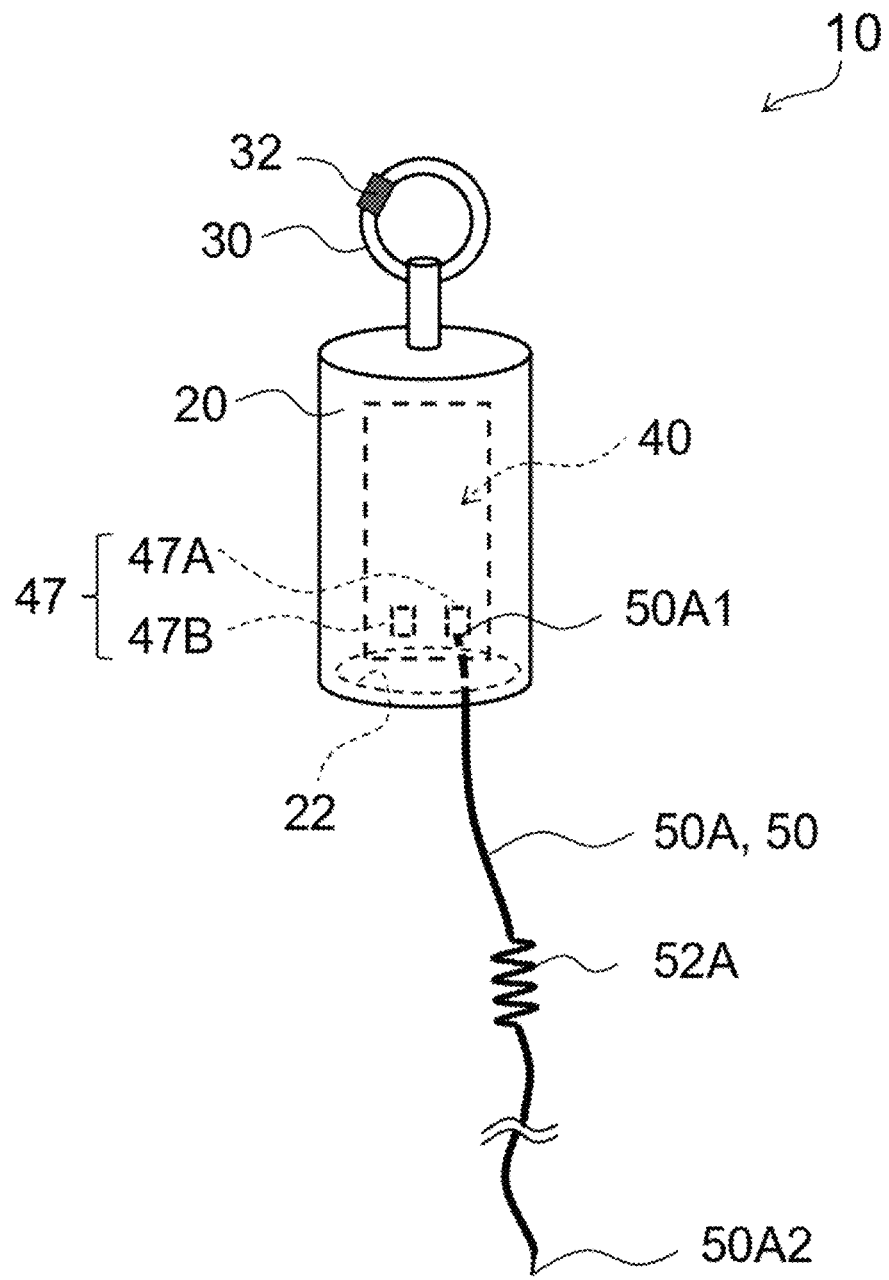
FIG. 10 illustrates a coil partly in the form of a wire as a solenoid.

The electric wire 50A may be as shown in FIG. 10. The coil 52A (the solenoid 52A) is formed in a part of the electric wire 50A. Although the number of turns N of coil 52A is 4 in FIG. 10, this is only an example. The electric wire 50A is, for example, a string-like member that is elastically deformable in the seawater SW.

Figure 11:
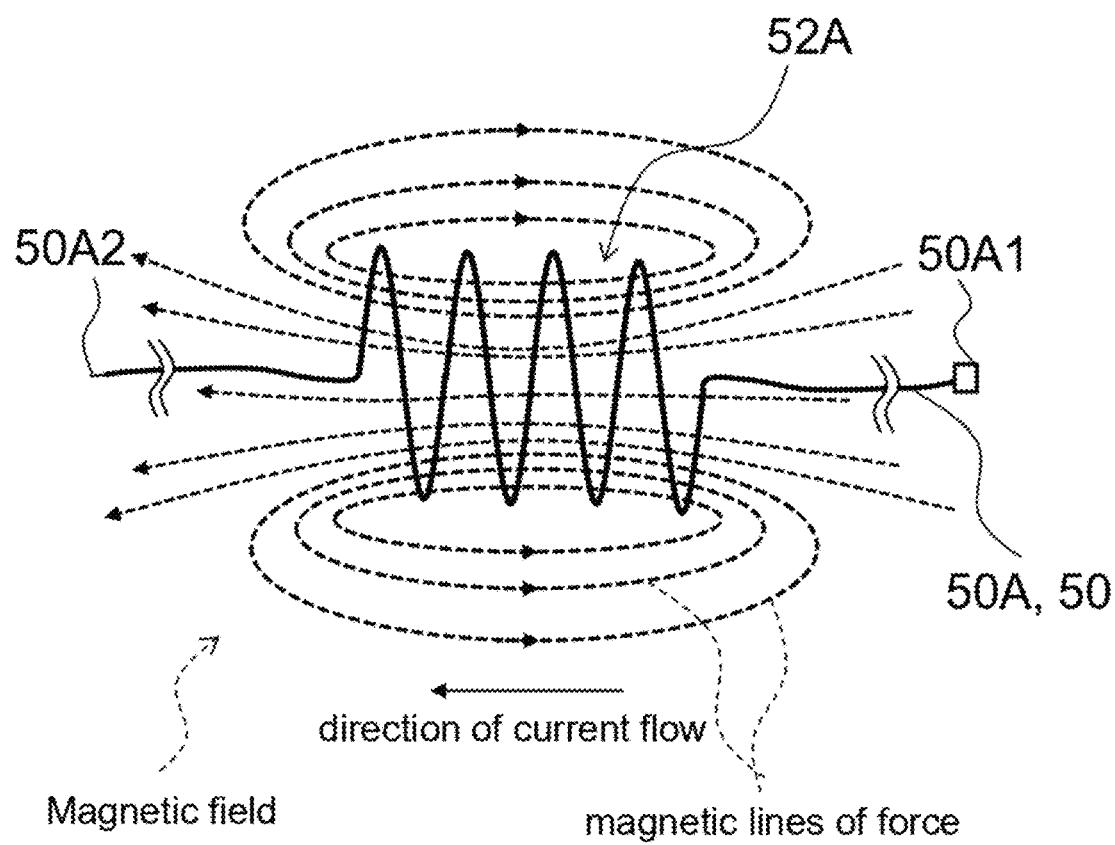
FIG. 11 illustrates an alternating magnetic field (a magnetic field different from the magnetic field generated by the earth) synchronized with the alternating current I is formed around a coil according to the right-hand screw rule.

Since the coil 52A is formed on the electric wire 50A, an alternating magnetic field (a magnetic field different from the magnetic field generated by the earth) synchronized with the alternating current I is formed around the coil 52A according to the right-hand screw rule (FIG. 11).

Figure 12:
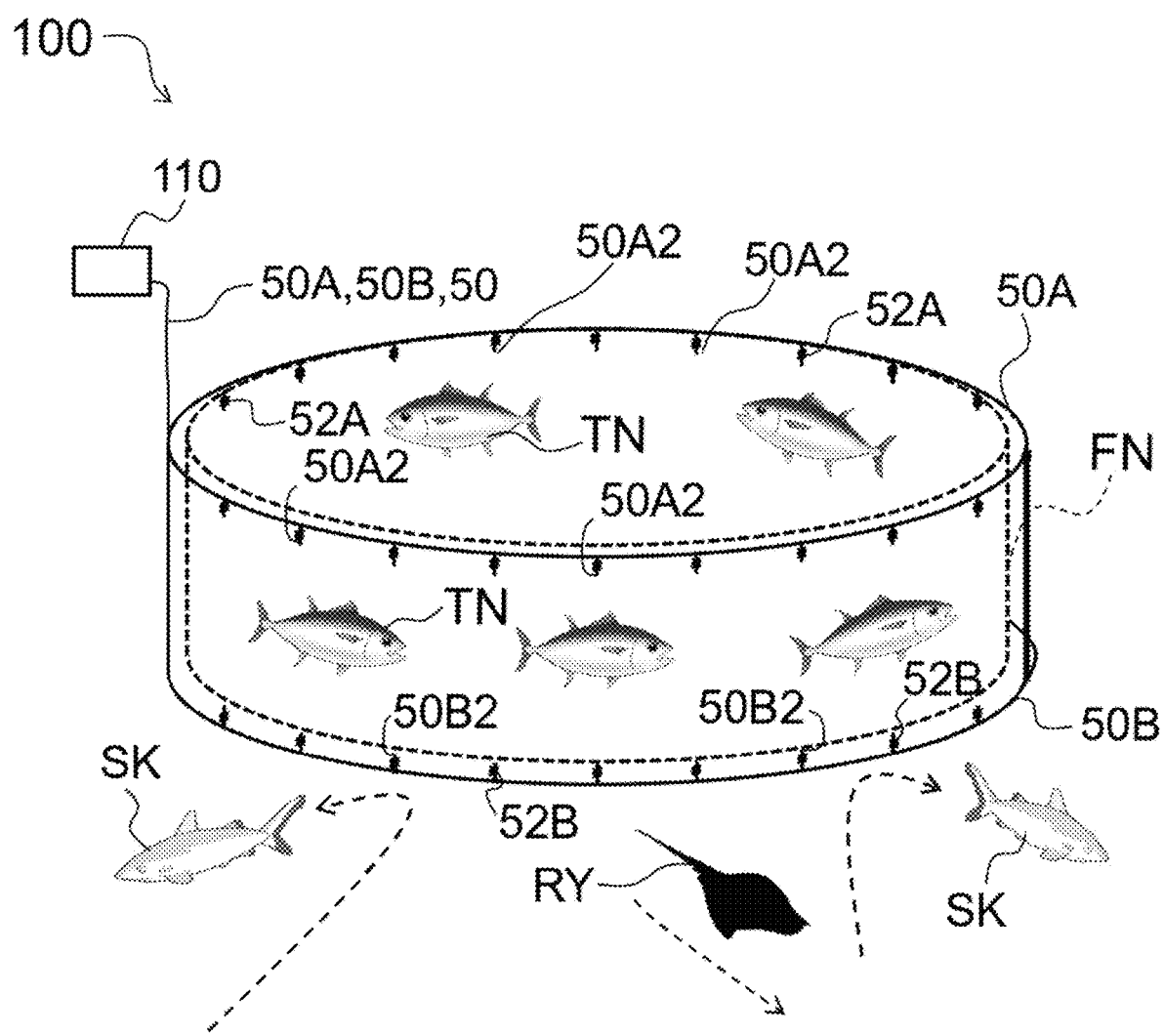
FIG. 12 illustrates an example in which two coils are formed.

Since the electric wire 50A is a string-like member that can be elastically deformed in the seawater SW, the axial direction of the magnetic field around the coil 52A is changed by moving in the seawater SW. As a result, the shark SK and ray RY in the vicinity of the coil 52A detect the generated alternating magnetic field by Lorenzini organs, causing confusion in judgment of the magnetic field received from the earth. Also, two or more coils 52A may be formed in a part of the electric wire 50A. FIG. 12 shows an example in which two coils 52A are formed.

Figure 6:
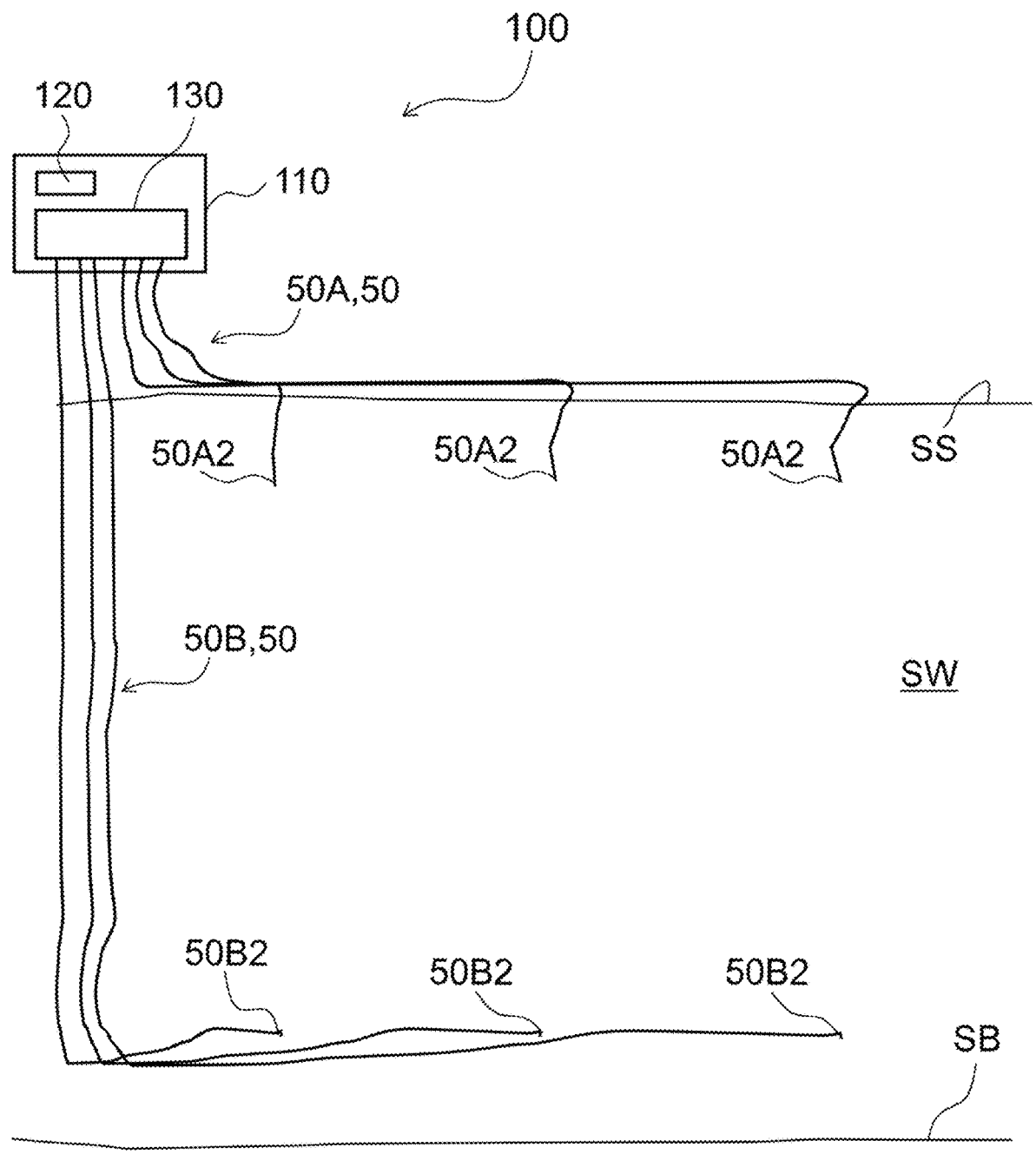
FIG. 6 is a schematic diagram of an electric field barrier forming apparatus of this embodiment.
Figure 7:
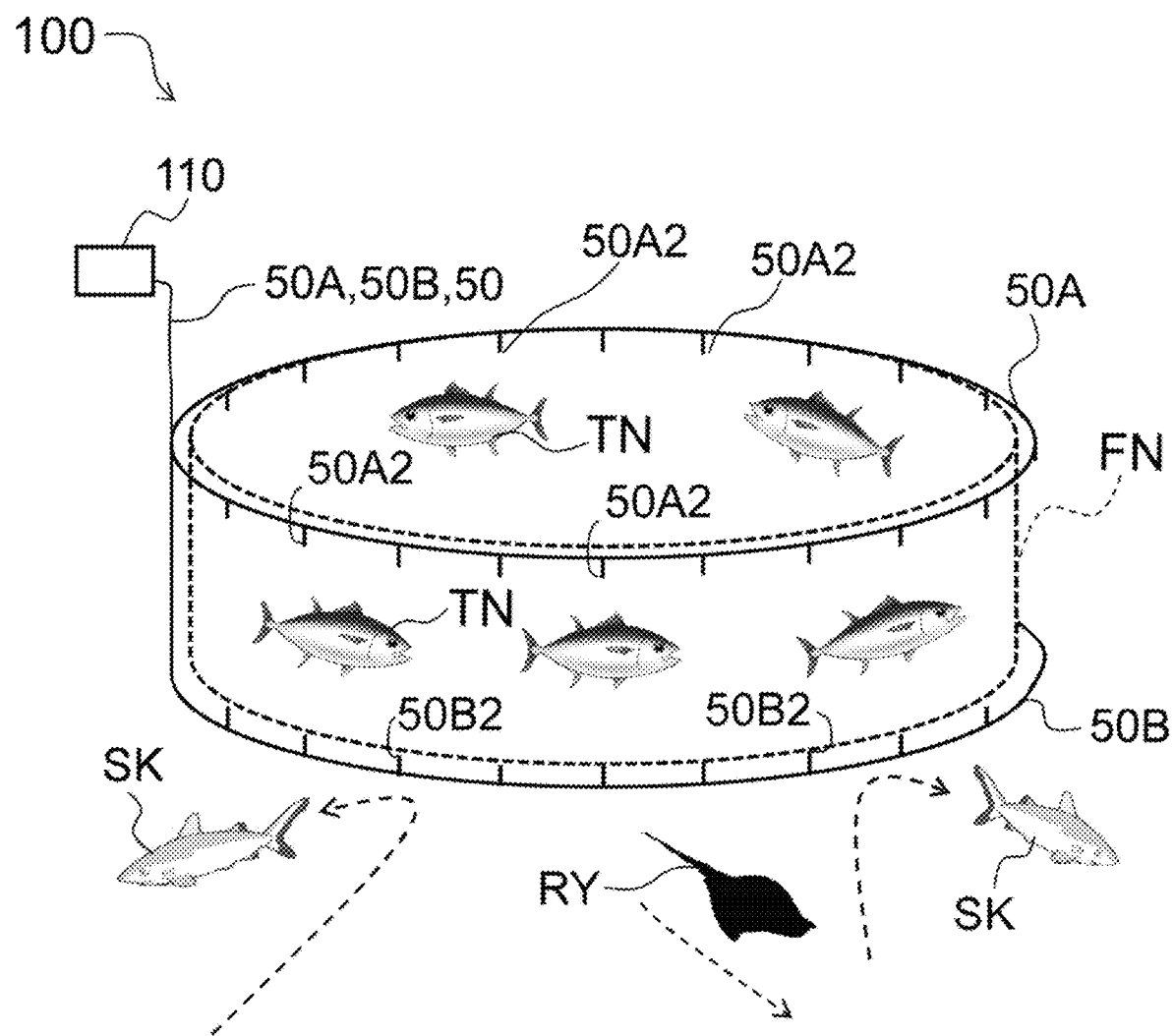
FIG. 7 is a diagram for explaining a case in which an electric field barrier forming device of this embodiment is used in a fish farming net.
Figure 8:
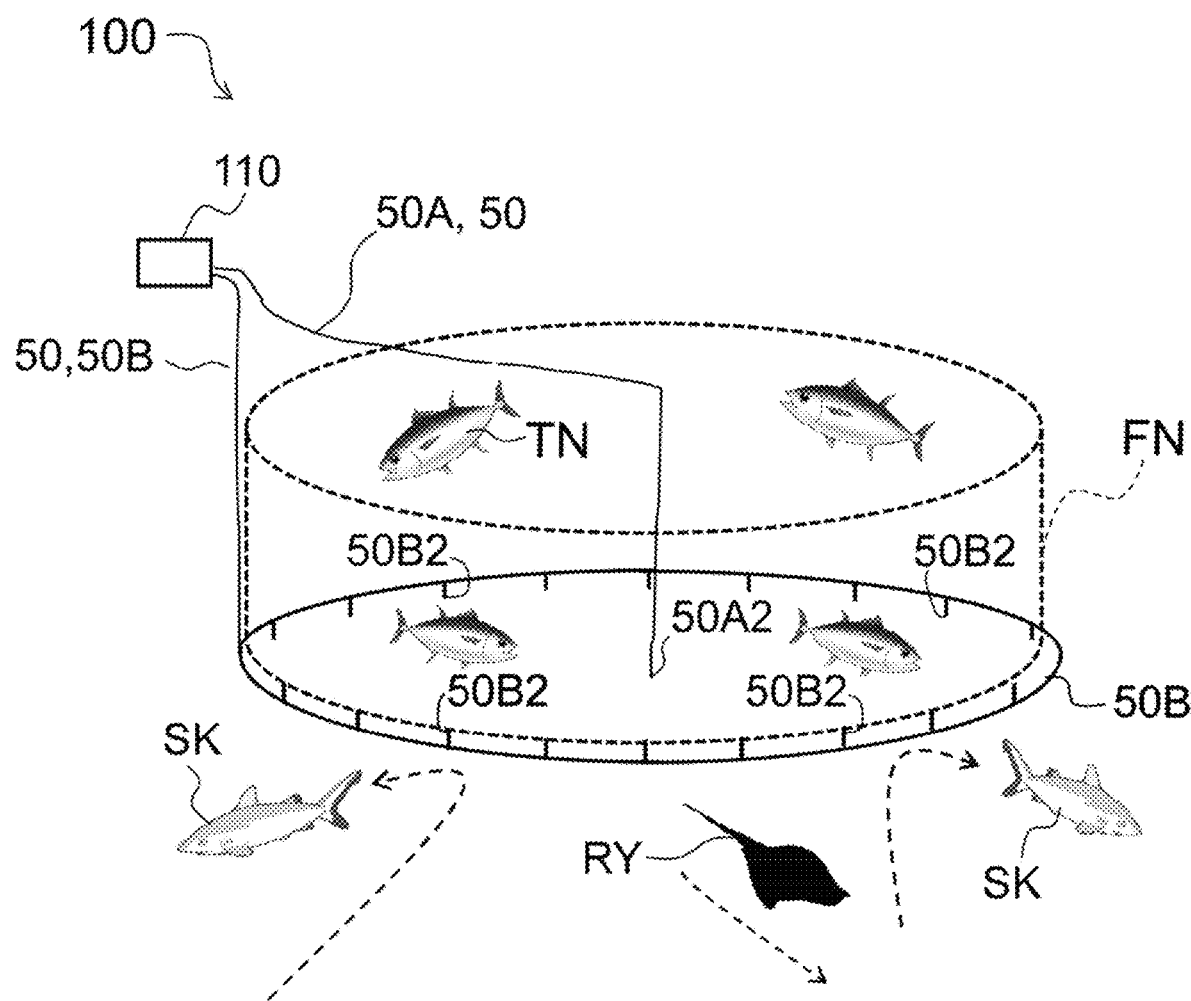
FIG. 8 is a diagram for explaining another case in which an electric field barrier forming device of this embodiment is used in a fish farming net.
Figure 9:
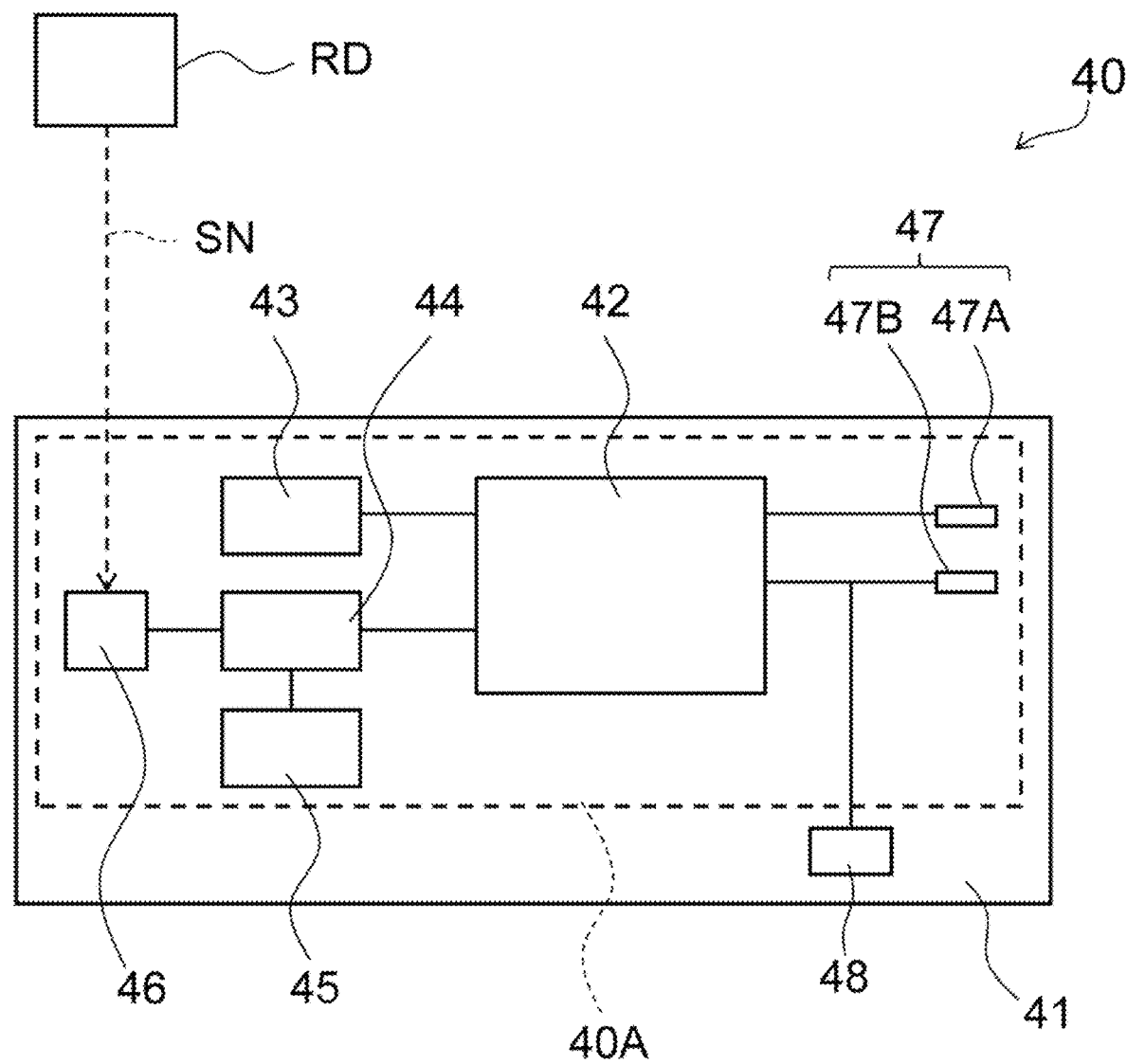
FIG. 9 is a block diagram of a circuit board included in a modified electronic device.
Figure 13:
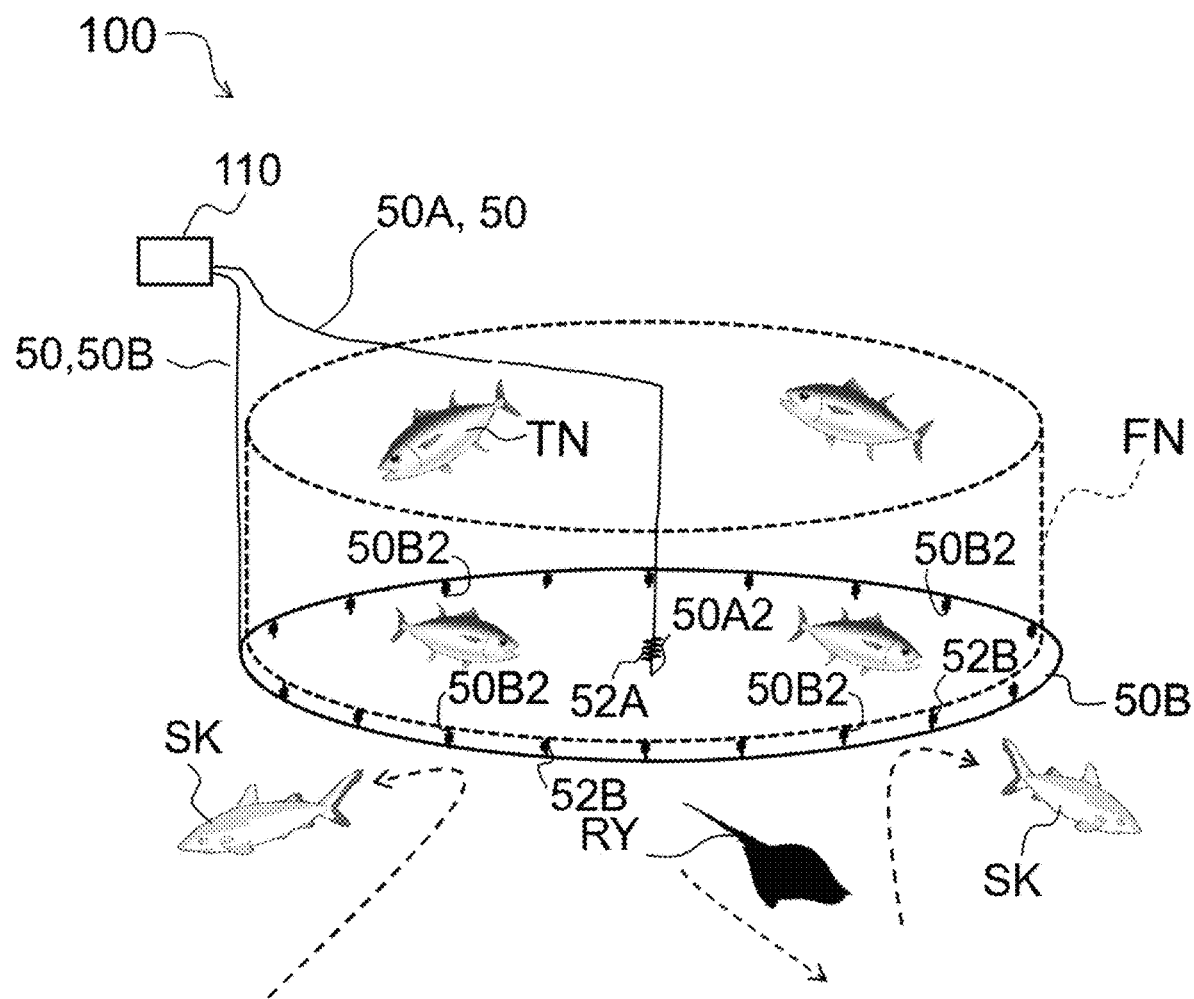
FIG. 13 illustrates another example in which two coils are formed.

Furthermore, as shown in FIGS. 12 and 13, the electronic device of this modification may be applied to the electric field barrier forming device of FIGS. 6 to 8 to form a magnetic field barrier forming device.

What is claimed is:

1. An electronic fish repelling device for repelling fish with Lorenzini organs, comprising:
    a generator having a power supply and output terminals including a first output terminal and a second output terminal, for converting a DC voltage supplied from the power supply to an AC voltage having an amplitude of less than 100V and outputting the AC voltage from the output terminals;
    at least one electric wire, one or each of which is connected to one or both of the first output terminal and the second output terminal; and,
    an electric circuit comprising a power switch, the generator and the at least one electric wire, the electric circuit for turning on and turning off am output from the power supply, the power supply supplying a DC voltage when the first output terminal and the second output terminal are electrically connected via the seawater,
    wherein the generator outputting a composite waveform pattern of the AC voltage output from the output terminals, the composite waveform pattern comprising a plurality of superimposed types of AC waveforms, and
    wherein the composite waveform pattern is one of
        (1) a first waveform pattern in which a unit wave having a first period and a unit wave having a second period shorter than the first period are alternately output,
        (2) a second waveform pattern in which a first amplitude unit wave and a second amplitude unit wave having an amplitude smaller than the first amplitude unit wave are alternately output, and
        (3) a third waveform pattern in which a unit wave of the first waveform and a second unit wave of a different unit wave from the unit wave of the first waveform are alternately output;
    wherein the generator further comprises:
        a storage that stores a plurality of patterns of AC voltage, which is output from the first output terminal and the second output terminal, having different waveforms; and
        a selecting switch for selecting one of the plurality of patterns of AC voltage stored in the storage;
    wherein the power switch comprises an electrical current sensor to supply a DC voltage from the power supply when the electrical current sensor detects an electrical current flowing between the first output terminal and the second output terminal; and
    the selecting switch selects one of the plurality of patterns of AC voltage stored in the storage according to the magnitude of the electrical current detected by the electrical current sensor.

2. The electronic fish repelling device according to claim 1, wherein the at least one electric wire is two electric wires each having one end connected to each of the first output terminal and the second output terminal and each of the two electric wires is configured to be attached to each of both human legs.

3. The electronic fish repelling device according to claim 1, further comprising
    a housing having an opening, the housing that accommodates the generator and the power switch therein and that passes the at least one electric wire through the opening; and
    a hook fixed to the housing and that passes through a fishing line.

4. The electronic fish repelling device according to claim 1, wherein
    the selecting switch is capable of receiving a wireless selective signal from the outside and selecting one of the plurality of patterns of AC voltage.

5. A field forming device for forming an electric field barrier for repelling fish having Lorenzini organs, the field forming device comprising:
    a barrier group comprising a plurality of electronic fish repelling devices; each electronic fish repelling device for repelling fish with Lorenzini organs,
    each electronic fish repelling device comprising:
        a generator having a power supply and output terminals including a first output terminal and a second output terminal, for converting a DC voltage supplied from the power supply to an AC voltage having an amplitude of less than 100V and outputting the AC voltage from the output terminals;
        at least one electric wire, one or each of which is connected to one or both of the first output terminal and the second output terminal; and,
        an electric circuit comprising a power switch, the generator and the at least one electric wire, the electric circuit for turning on and turning off am output from the power supply, the power supply supplying a DC voltage when the first output terminal and the second output terminal are electrically connected via the seawater,
        wherein the generator outputting a composite waveform pattern of the AC voltage output from the output terminals, the composite waveform pattern comprising a a plurality of superimposed types of AC waveforms, and
        wherein the composite waveform pattern is one of
            (1) a first waveform pattern in which a unit wave having a first period and a unit wave having a second period shorter than the first period are alternately output,
            (2) a second waveform pattern in which a first amplitude unit wave and a second amplitude unit wave having an amplitude smaller than the first amplitude unit wave are alternately output, and
            (3) a third waveform pattern in which a unit wave of the first waveform and a second unit wave of a different unit wave from the unit wave of the first waveform are alternately output;
        wherein (1) the at least one electric wire of each electronic device is a pair of electric wires each having one end connected to each of the first output terminal and the second output terminal; (2) both the other ends of the plurality of pairs of electric wires are respectively arranged along a vertical or substantially vertical direction in the seawater; and (3) all the other ends of the plurality of pairs of electric wires are arranged side by side in a direction crossing the vertical or substantially vertical direction; and, a group controller that controls waveforms of AC voltages output from generators of the plurality of electronic devices, wherein the group controller controls at least one waveform and at least one phase among the waveforms of each AC voltage output by each generator to a waveform or phase different from other waveforms or phases;

wherein the generator further comprises:
  a storage that stores a plurality of patterns of AC voltage, which is output from the first output terminal and the second output terminal, having different waveforms; and
  a selecting switch for selecting one of the plurality of patterns of AC voltage stored in the storage;

wherein the power switch comprises an electrical current sensor to supply a DC voltage from the power supply when the electrical current sensor detects an electrical current flowing between the first output terminal and the second output terminal; and the selecting switch selects one of the plurality of patterns of AC voltage stored in the storage according to the magnitude of the electrical current detected by the electrical current sensor.

6. A field forming device for forming an electric field barrier for repelling fish having Lorenzini organs, the field forming device comprising:

a barrier group comprising a plurality of electronic fish repelling devices; each electronic fish repelling device for repelling fish with Lorenzini organs, each electronic fish repelling device comprising:
  a generator having a power supply and output terminals including a first output terminal and a second output terminal, for converting a DC voltage supplied from the power supply to an AC voltage having an amplitude of less than 100V and outputting the AC voltage from the output terminals;
  at least one electric wire, one or each of which is connected to one or both of the first output terminal and the second output terminal; and,
  an electric circuit comprising a power switch, the generator and the at least one electric wire, the electric circuit for turning on and turning off am output from the power supply, the power supply supplying a DC voltage when the first output terminal and the second output terminal are electrically connected via the seawater,
  wherein the generator outputting a composite waveform pattern of the AC voltage output from the output terminals, the composite waveform pattern comprising a plurality of superimposed types of AC waveforms, and
  wherein the composite waveform pattern is one of
    (1) a first waveform pattern in which a unit wave having a first period and a unit wave having a second period shorter than the first period are alternately output,
    (2) a second waveform pattern in which a first amplitude unit wave and a second amplitude unit wave having an amplitude smaller than the first amplitude unit wave are alternately output, and
    (3) a third waveform pattern in which a unit wave of the first waveform and a second unit wave of a different unit wave from the unit wave of the first waveform are alternately output;

wherein: (1) the at least one electric wire of each electronic device is a pair of electric wires each having one end connected to each of the first output terminal and the second output terminal; (2) the other ends of the plurality of electric wires connected to either one of the first output terminal and the second output terminal are arranged so as to gather at one point in the seawater, and the other ends of the plurality of electric wires connected to the other of the first output terminal and the second output terminal are arranged apart from each other so as to form a circumference outside the one point; and, a group controller that controls waveforms of AC voltages output from generators of the plurality of electronic devices, wherein the group controller controls at least one waveform and at least one phase among the waveforms of the AC voltages output from each generator to a waveform or phase different from other waveforms or phases;

wherein the generator further comprises:
  a storage that stores a plurality of patterns of AC voltage, which is output from the first output terminal and the second output terminal, having different waveforms; and
  a selecting switch for selecting one of the plurality of patterns of AC voltage stored in the storage;

wherein the power switch comprises an electrical current sensor to supply a DC voltage from the power supply when the electrical current sensor detects an electrical current flowing between the first output terminal and the second output terminal; and the selecting switch selects one of the plurality of patterns of AC voltage stored in the storage according to the magnitude of the electrical current detected by the electrical current sensor.

7. An electronic device for repelling fish with Lorenzini organs, comprising:

a generator having a power supply and output terminals including a first output terminal and a second output terminal, for converting a DC voltage supplied from the power supply to an AC voltage and outputting the AC voltage from the output terminals;

at least one electric wire, one or each of which is connected to one or both of the first output terminal and the second output terminal, and at least one or more coils are formed; and, a power switch that forms an electric circuit together with the generator and the at least one electric wire to turn on and off the output from the power supply, and that causes the power supply to supply a DC voltage when the first output terminal and the second output terminal are electrically connected via the seawater;

wherein the generator further comprises:
  a storage that stores a plurality of patterns of AC voltage, which is output from the first output terminal and the second output terminal, having different waveforms; and
  a selecting switch for selecting one of the plurality of patterns of AC voltage stored in the storage;

wherein the power switch comprises an electrical current sensor to supply a DC voltage from the power supply when the electrical current sensor detects an electrical current flowing between the first output terminal and the second output terminal; and the selecting switch selects one of the plurality of patterns of AC voltage stored in the storage according to the magnitude of the electrical current detected by the electrical current sensor.

8. A magnetic field barrier forming device for forming a magnetic field barrier for repelling fish having Lorenzini organs, the magnetic field barrier forming device comprising:
- an electronic device group comprising a plurality of electronic devices, each of which is the electronic device for repelling fish with Lorenzini organs, comprising:
  - a generator having a power supply and output terminals including a first output terminal and a second output terminal, for converting a DC voltage supplied from the power supply to an AC voltage and outputting the AC voltage from the output terminals;
  - at least one electric wire, one or each of which is connected to one or both of the first output terminal and the second output terminal, and at least one or more coils are formed; and,
  - a power switch that forms an electric circuit together with the generator and the at least one electric wire to turn on and off the output from the power supply, and that causes the power supply to supply a DC voltage when the first output terminal and the second output terminal are electrically connected via the seawater,
  - wherein: (1) the at least one electric wire of each electronic device is a pair of electric wires each having one end connected to each of the first output terminal and the second output terminal; (2) both the other ends of the plurality of pairs of electric wires are respectively arranged along a vertical or substantially vertical direction in the seawater; and (3) all the other ends of the plurality of pairs of electric wires are arranged side by side in a direction crossing the vertical or substantially vertical direction; and,
- a group controller that controls waveforms of AC voltages output from generators of the plurality of electronic devices;
- wherein the generator further comprises:
  - a storage that stores a plurality of patterns of AC voltage, which is output from the output terminals, having different waveforms; and
  - a selecting switch for selecting one of the plurality of patterns of AC voltage stored in the storage;
- wherein the power switch comprises an electrical current sensor to supply a DC voltage from the power supply when the electrical current sensor detects an electrical current flowing between the first output terminal and the second output terminal; and
- the selecting switch selects one of the plurality of patterns of AC voltage stored in the storage according to the magnitude of the electrical current detected by the electrical current sensor.

9. A magnetic field barrier forming device for forming a magnetic field barrier for repelling fish having Lorenzini organs, the magnetic field barrier forming device comprising:
- an electronic device group comprising a plurality of electronic devices, each of which is the electronic device for repelling fish with Lorenzini organs, comprising:
  - a generator having a power supply and output terminals including a first output terminal and a second output terminal, for converting a DC voltage supplied from the power supply to an AC voltage and outputting the AC voltage from the output terminals;
  - at least one electric wire, one or each of which is connected to one or both of the first output terminal and the second output terminal, and at least one or more coils are formed; and
  - a power switch that forms an electric circuit together with the generator and the at least one electric wire to turn on and off the output from the power supply, and that causes the power supply to supply a DC voltage when the first output terminal and the second output terminal are electrically connected via the seawater;
  - wherein: (1) the at least one electric wire of each electronic device is a pair of electric wires each having one end connected to each of the first output terminal and the second output terminal; (2) the other ends of the plurality of electric wires connected to either one of the first output terminal and the second output terminal are arranged so as to gather at one point in the seawater, and the other ends of the plurality of electric wires connected to the other of the first output terminal and the second output terminal are arranged apart from each other so as to form a circumference outside the one point; and,
- a group controller that controls waveforms of AC voltages output from generators of the plurality of electronic devices;
- wherein the generator further comprises:
  - a storage that stores a plurality of patterns of AC voltage, which is output from the output terminals, having different waveforms; and
  - a selecting switch for selecting one of the plurality of patterns of AC voltage stored in the storage;
- wherein the power switch comprises an electrical current sensor to supply a DC voltage from the power supply when the electrical current sensor detects an electrical current flowing between the first output terminal and the second output terminal; and
- the selecting switch selects one of the plurality of patterns of AC voltage stored in the storage according to the magnitude of the electrical current detected by the electrical current sensor.

* * * * *